United States Patent [19]

Reynaud et al.

[11] Patent Number: 4,701,092
[45] Date of Patent: Oct. 20, 1987

[54] PALLET DISPENSER

[75] Inventors: Gary L. Reynaud, Strafford; Calbert Allcorn, Springfield, both of Mo.

[73] Assignee: Yarbrough'o Machine Shop, Springfield, Mo.

[21] Appl. No.: 702,089

[22] Filed: Feb. 15, 1985

[51] Int. Cl.⁴ .................................... B65G 59/06
[52] U.S. Cl. ............................ 414/115; 221/251; 221/293; 414/786; 414/128; 414/37
[58] Field of Search ............... 414/101, 102, 125, 126, 414/127, 128, 110, 131, 112, 113, 115, 37, 786; 221/251, 293

[56] References Cited

U.S. PATENT DOCUMENTS

| | | | |
|---|---|---|---|
| 2,629,503 | 2/1953 | Neja | 414/125 X |
| 2,707,067 | 4/1955 | Paxton | 221/293 |
| 2,858,043 | 10/1958 | Fenton et al. | 414/125 X |
| 2,974,828 | 3/1961 | Matteson | 221/251 X |
| 3,273,751 | 9/1966 | De Wees | 414/126 X |
| 3,468,455 | 9/1969 | Voorhis | 221/251 X |
| 3,677,439 | 7/1972 | Bosworth et al. | 221/251 |
| 4,221,519 | 9/1980 | Nord et al. | 414/101 X |
| 4,352,617 | 10/1982 | Sakai et al. | 414/127 X |

FOREIGN PATENT DOCUMENTS

| | | | |
|---|---|---|---|
| 3047914 | 7/1982 | Fed. Rep. of Germany | 414/125 |
| 2399372 | 4/1979 | France | 414/127 |

Primary Examiner—Frank E. Werner
Attorney, Agent, or Firm—Thomas M. Scofield

[57] ABSTRACT

Methods of and apparatus for first establishing an elongate vertical stack of pallets within a surrounding vertical frame on special supporting and dispensing apparatus and thereafter sequentially dispensing individual pallets from the low end of said stack to floor level for pick up by conventional, pallet handling fork trucks; methods of and apparatus for establishing, first, a plurality of axially aligned elongate vertical stacks of pallets mounted on special supporting and dispensing apparatus within a retaining, surrounding vertical frame and thereafter sequentially or simultaneously dispensing individual pallets from one or more of the axially aligned stacks of pallets for single or multiple pickup by the fork members of conventional pallet handling trucks.

24 Claims, 18 Drawing Figures

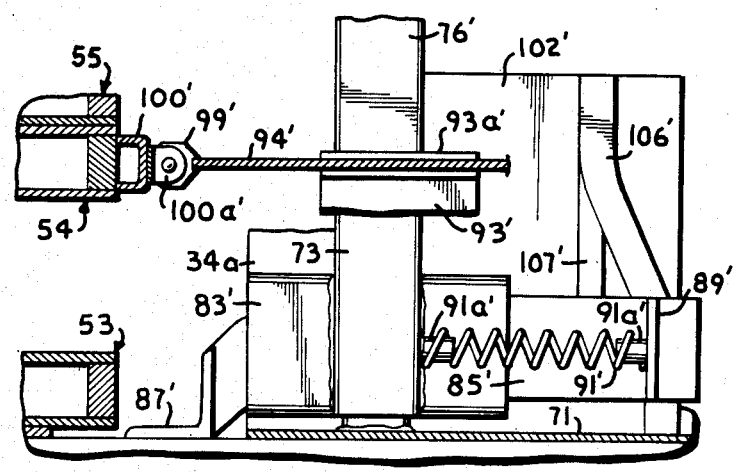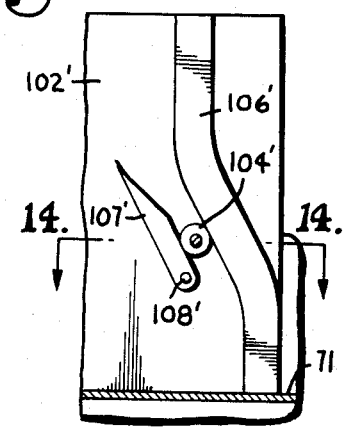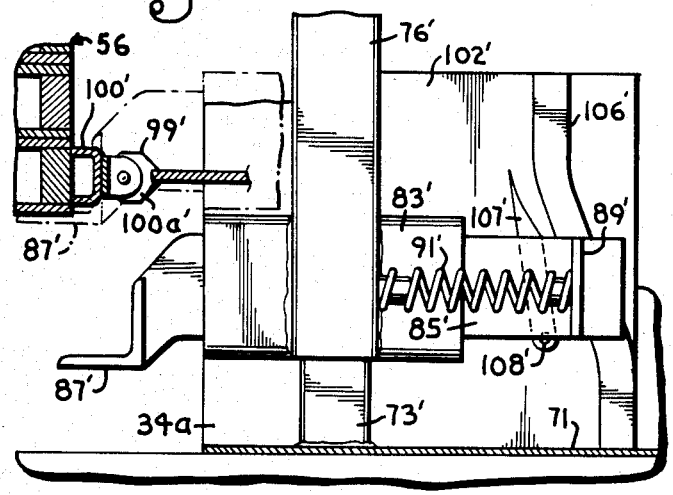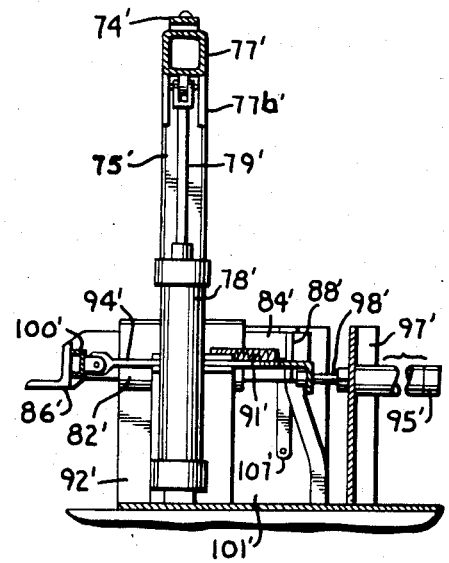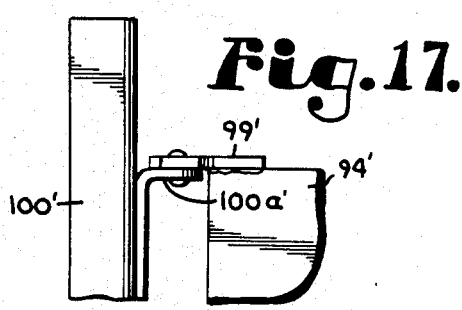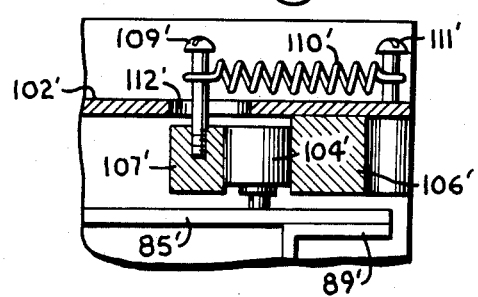

PALLET DISPENSER

BACKGROUND OF THE INVENTION

The conventional material handling pallet typically is formed with normally horizontal, vertically spaced apart, top and bottom walls, such top and bottom walls not only vertically spaced apart, but also connected together by normally vertical elongate side walls. The longitudinal axial space between the said top, bottom and side walls is adapted to receive therewithin tongue or fork members of pallet handling trucks. With one or more pallets speared on the normally horizontal, elongate tongue or fork members of the pallet handling truck, such pallet(s) may be moved around a warehouse receiving materials from various storage points piled thereon. Once the pallets are loaded, they are typically moved to loading docks by the pallet handling trucks, there to be deposited to be loaded, when convenient, on other vehicles to carry the pallets of materials to their ultimate destination. In common use, there is, first, a number of loaded pallets being regularly dispensed from a typical warehouse, often in a relatively continuous stream. New or replacement pallets are supplied to the warehouse as required (or continuously) thus to maintain available the supplies of pallets for the described materials handling.

Large number of pallets take up large quantities of space, even when piled or stacked in storage areas of the warehouse. Means are not currently readily available for easily handling individual pallets from disordered stacks or high stacks of pallets, which situation gives rise to the need for:

(1) Means for establishing and maintaining high, aligned, vertical stacks of pallets; and (2) Means for dispensing pallets sequentially in an orderly, convenient fashion from the bottom ends of said pallet stacks.

The point is that, without such proper vertical storage and controlled bottom level dispensing from the vertical storage, significant costs are incurred in the warehouse, as well as physical difficulties. Thus, there is a substantial loss of space to pallet storage which could be otherwise dedicated to machine space or other storage and, as well, there are maintenance problems and costs from damage to unprotected pallets from collisions with and handling problems with trucks and fork lifts. The difficulties of top of stack pallet dispensing are multifold, as well as hazardous.

Pallets are useful in myriad types of industrial plants and storage facilities. In such, pallets are currently indispensable as a material handling expedient. Firms using extensive numbers of pallets have found that maintenance of same constitutes a costly item of overhead. Frequent replacement of heavily damaged pallets and repair of slightly damaged pallets annually occasion increasing expense to many industrial users. Stacking or spotting pallets indiscriminately throughout a plant, as opposed to customarily storing same in convenient, yet unobstructive locations, is one primary cause for pallet damage. Absent proper stacking, in protected manner, pallets are exposed to damage by mobile agents, including trucks, in a plant, warehouse or the grounds thereof. Workmen typically demonstrate little care in handling pallets when such are scattered throughout the plant. Consequently through such careless treatment, the life of each pallet is markedly reduced, with additional expected increase in expensive maintenance.

To the contrary, where unloaded pallets are compactly stored in stacked formation, maximum economy in plant space may be effected, demanding minimum floor area. Orderly storage releases valuable areas for productive purposes while aiding and protecting the pallet against damage.

THE PRIOR ART

Applicant is aware of the following three patents directed to pallet dispensers of various types:

U.S. Pat. No. 2,858,043, issued Oct. 28, 1958 for "Pallet Dispensers", inventors Fenton et al;

U.S. Pat. No. 3,623,618 "Pallet Storage And Delivery Mechanism", issued Nov. 30, 1971 to inventor Stanley B. Shaw;

U.S. Pat. No. 3,003,661, issued Oct. 10, 1961 for "Article Handling Machine" to Earl J. McGrath.

Another pallet related machine is the patent to Kemp, Jr. U.S. Pat. No. 3,269,568 "Apparatus For Unstacking Pallets", issued Aug. 30, 1966.

In addition to the specific pallet storing and handling devices previously noted, applicant is aware of the following patents directed to stacking and dispensing of various other elements or items:

U.S. Pat. No. 3,443,706 issued May 13, 1969 for "Method For Arranging . . . Platelike Elements . . . In a Predetermined Sequence", inventor Puhm;

U.S. Pat. No. 3,664,521, issued May 23, 1972 for "Separator For Nested Articles", inventor Feher;

U.S. Pat. No. 4,247,238, issued Jan. 27, 1981 for "Stacking And Unstacking Apparatus", inventor Imhauser, et al;

U.S. Pat. No. 4,291,819 issued Sept. 29, 1981 for "High Speed Dispenser For Electrical Components", inventors Heller et al; and U.S. Pat. No. 4,423,828, issued Jan. 3, 1984 for "Goods Discharging Mechanism . . . And Discharge System Of Automatic Vending Machine" inventor Tuanaka et al.

OBJECTS OF THE INVENTION

A first object of the invention is to provide improved means for receiving, in a vertical stack, a very considerable number of individual pallets in precise, overlying registering relationship (one above the other) and supporting the stack suspended above floor level until one or more of the pallets are required for use.

Another object of the invention is to provide such pallet receiving and supporting means which have associated therewith further means and mechanisms for sequentially dispensing one or several pallets from the bottom of the stack while retaining the remainder of the stack suspended in storage position.

A further object of the invention is to provide a new and unique process for receiving, holding and dispensing pallets in and from an elongate, vertical stack thereof, the selection and discharge of pallets from the stack being from the bottom end thereof.

Another object is to provide such apparatus and process wherein a plurality of stacks of pallets may be axially aligned with one another so that conventional fork pickup trucks for handling pallets can pick up one or more pallets dispensed from one or more of the stacks at a single time.

Still another object of the invention include providing means which powerfully and securely support and handle a very considerable height, vertical stack of pallets in secure storage with dependable dispensing of pallets from the lower end of the said vertical stack thereof.

Yet another object of the invention is to provide a receiving frame for confining, in safe and stable relationships, a very considerable height vertical stack of pallets therewithin, there being additionally supplied, with respect to said storage frame, pallet stack holding, balancing and dispensing means which optimally achieve all the desired features of receipt, storage, handling and dispensing of pallets.

Other and further objects of the invention will appear in the course of the following description thereof.

THE DRAWINGS

In the drawings, which form a part of the instant specification and are to be read in conjunction therewith, embodiments of the invention are shown and, in the various views like numerals are used to indicate like parts.

Figure 3:
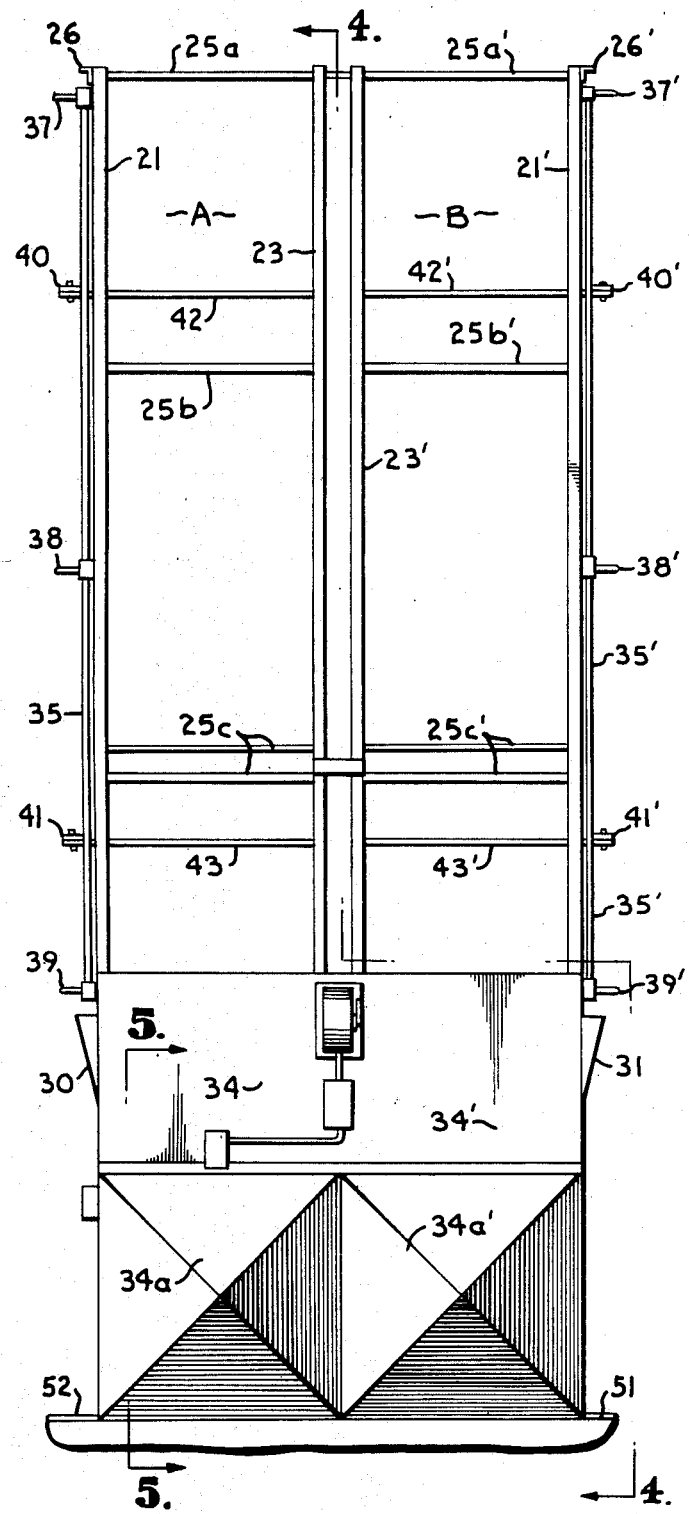
FIG. 3 is a side elevation, from the right hand side of FIG. 1, of the two axially aligned pallet machines of FIG. 1 showing the back to back juxtaposition of such.
Figure 5:
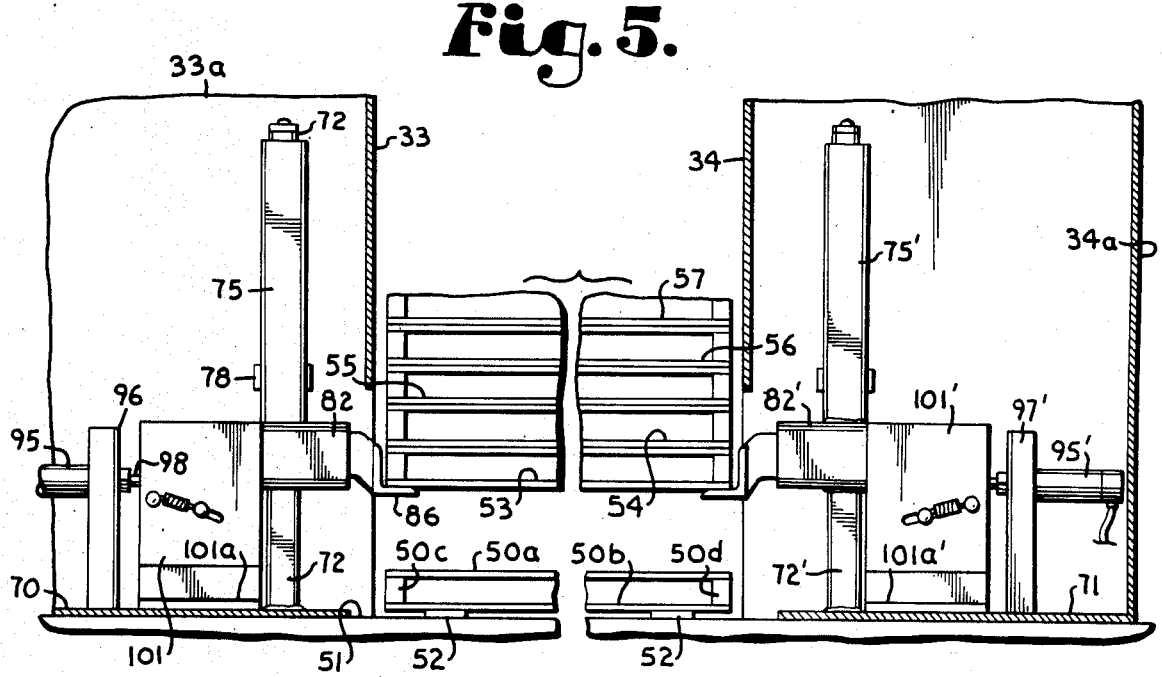

FIG. 5 is a view taken along the line 5—5 of FIG. 3 in the direction of the arrows. This view shows two opposed, pallet handling devices receiving the stack of pallets on underlying grabs or shelf members. This view also represents a process stage prior to activation of the device to supply a pallet from the bottom of the stack to replace the pallet seen on the floor between the two devices in question, as soon as the latter is removed from the floor space.

Figure 2:
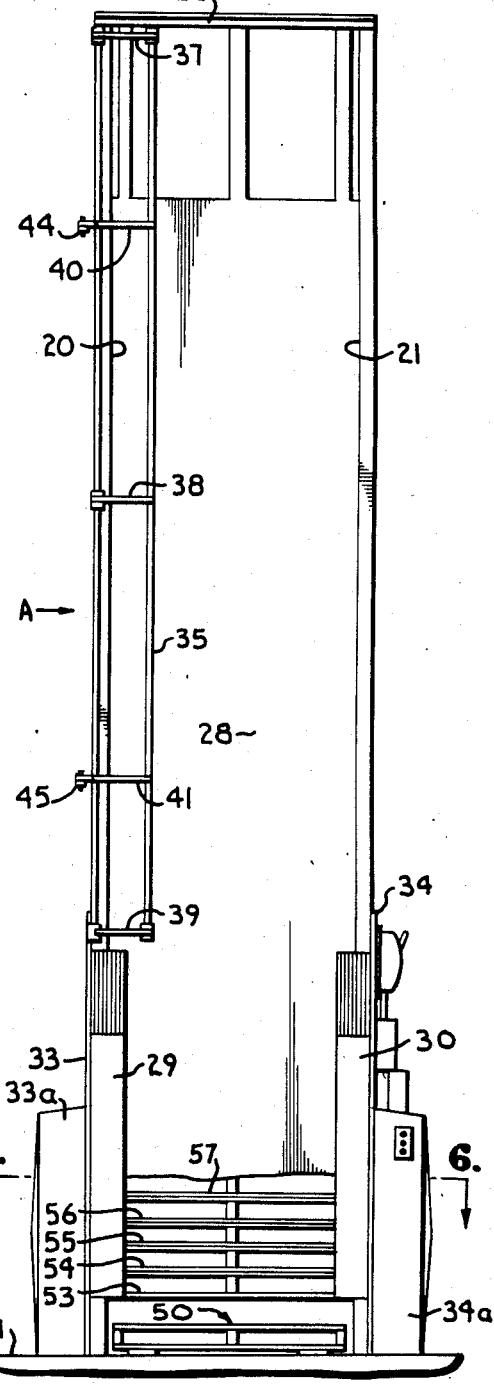
FIG. 2 is a front elevation of the forward pallet handling device of FIG. 1 with a portion of the pallet stack cut away so the rear wall of the front pallet handling device may be seen through the machine.
Figure 6:
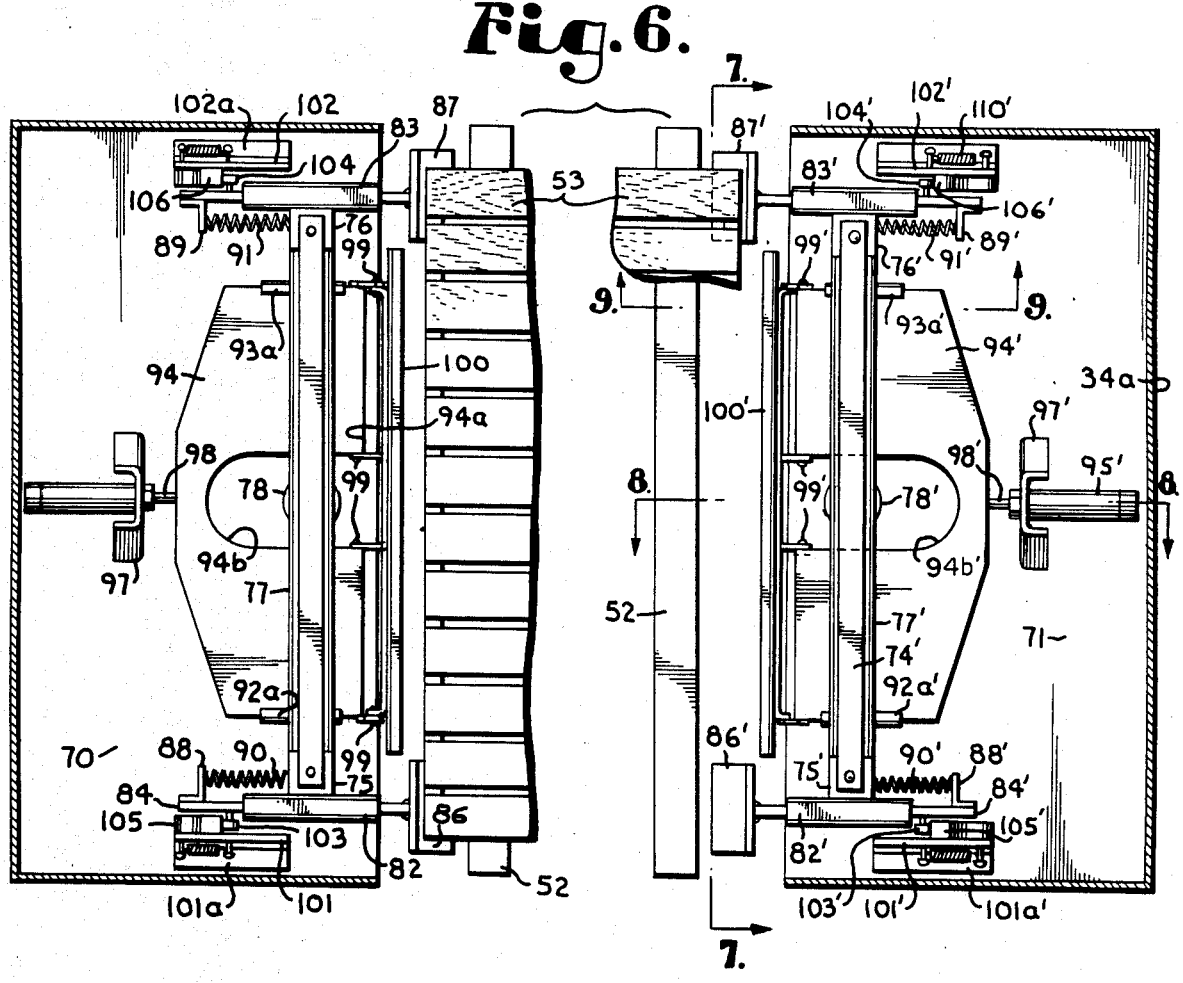

FIG. 6 is a view taken along the line 6—6 of FIG. 2 in the direction of the arrows (comprising a top view of the two opposed pallet carrying and handling devices of FIG. 5).

Figure 7:
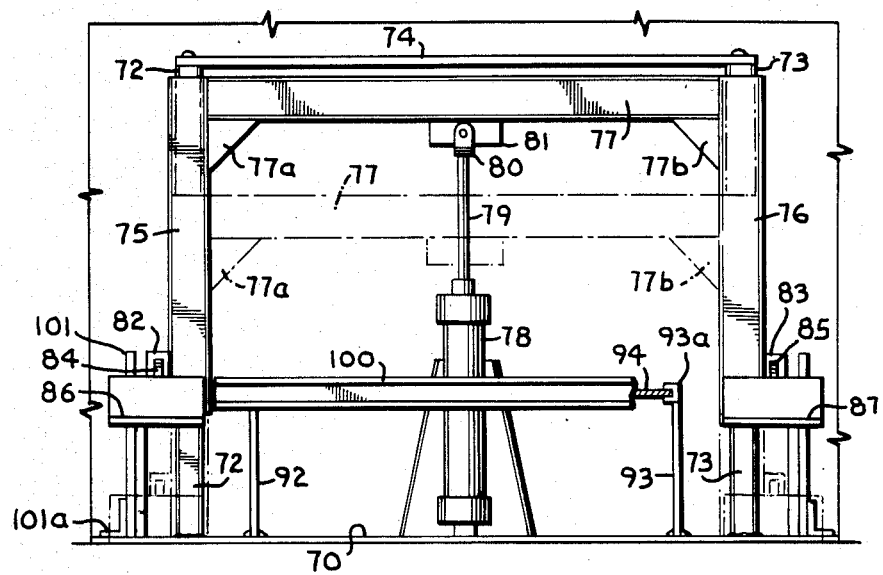

FIG. 7 is a view taken along the line 7—7 of FIG. 6 in the direction of the arrows, with parts cut away to better illustrate the construction of certain parts of the device and a dotted line showing of the shelf member assembly of the device positioned in its lowest process position.

FIG. 8 is a view taken along the line 8—8 of FIG. 6 in the direction of the arrows.

Figure 9:
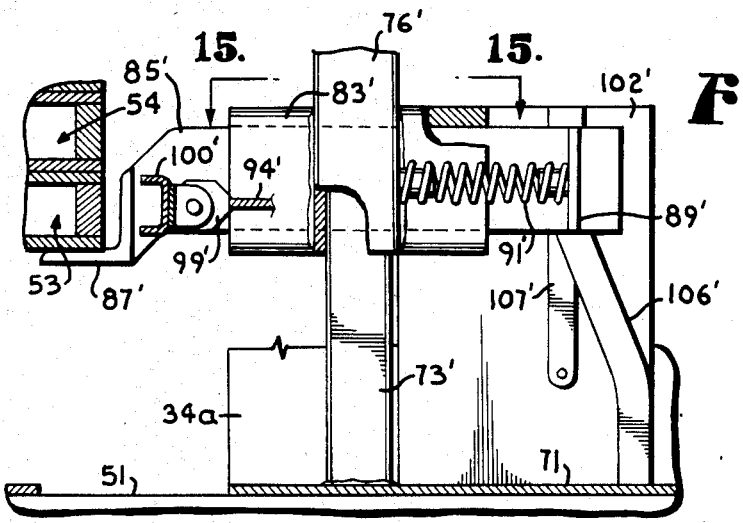

FIG. 9 is a view taken along the line 9—9 of FIG. 6 in the direction of the arrows, with parts cut away to better illustrate the structure of the certain elements illustrated. (In FIG. 9 the apparatus is at the uppermost "start" arrangement of the process, as is the case in FIGS. 5-8 inclusive.)

Figure 10:
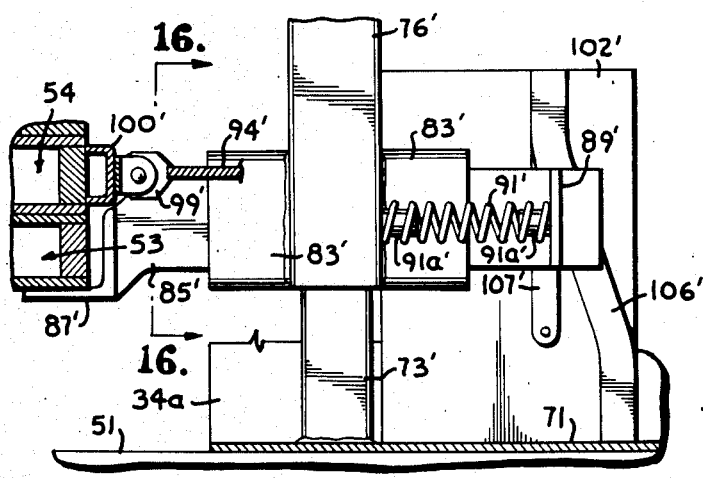

FIG. 10 is a view like FIG. 9 showing a later process stage where the entire stack of pallets (less the bottommost one) is supported by beam members gripping the sides of the second lowest pallet. The stack and shelf members have been lowered one pallet thickness to enable this engagement.

FIG. 11 is a view like that of FIGS. 9 and 10 wherein, however, the shelf members carrying the lowest pallet have reached their lowest process level and, the cam follower on the spring loaded arm having passed the forward cam member lower end, the said shelf members have been moved laterally outwardly away from the pallet carried down, thus placing it on the floor beams for pickup.

FIG. 12 is a view like FIGS. 9-11, inclusive but showing, in full lines, the follower of the lower spring loaded arm being moved upwardly between the cam surfaces. The full line showing shows an early stage in passage through the cam ways with the shelf members at an intermediate inward extension toward the pallet stack. The dotted line showing at the top shows the retractable and extendable arm carrying the shelf member fully inwardly extended to again carry the load of the entire stack of pallets.

FIG. 13 is a detail of the cam follower of one retractable and extendable arm carrying a shelf member received in the cam way about the full line position of FIG. 12.

FIG. 14 is a view taken along the line 14—14 of FIG. 13 in the direction of the arrows.

Figure 15:
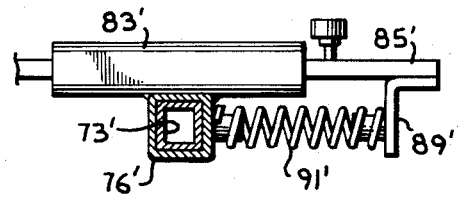

FIG. 15 is a fragmentary view taken along the line 15—15 of FIG. 9 in the direction of the arrows.

Figure 16:
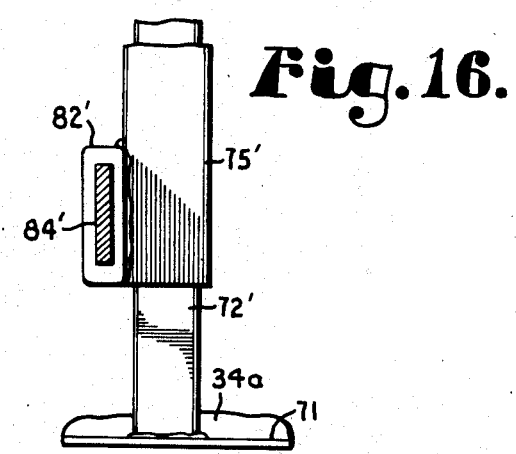

FIG. 16 is a view taken along the lines 16—16 of FIG. 10 in the direction of the arrows.

FIG. 17 is a fragmentary, enlarged, plan view of the connection of member 100' with plate 94'. This is an enlarged detail of the construction seen in upper left center of the right hand side of FIG. 6 and, as well, a plan view at right angles to the showing at left center of FIG. 10 of elements 100', 99' and 94'.

Figure 1:
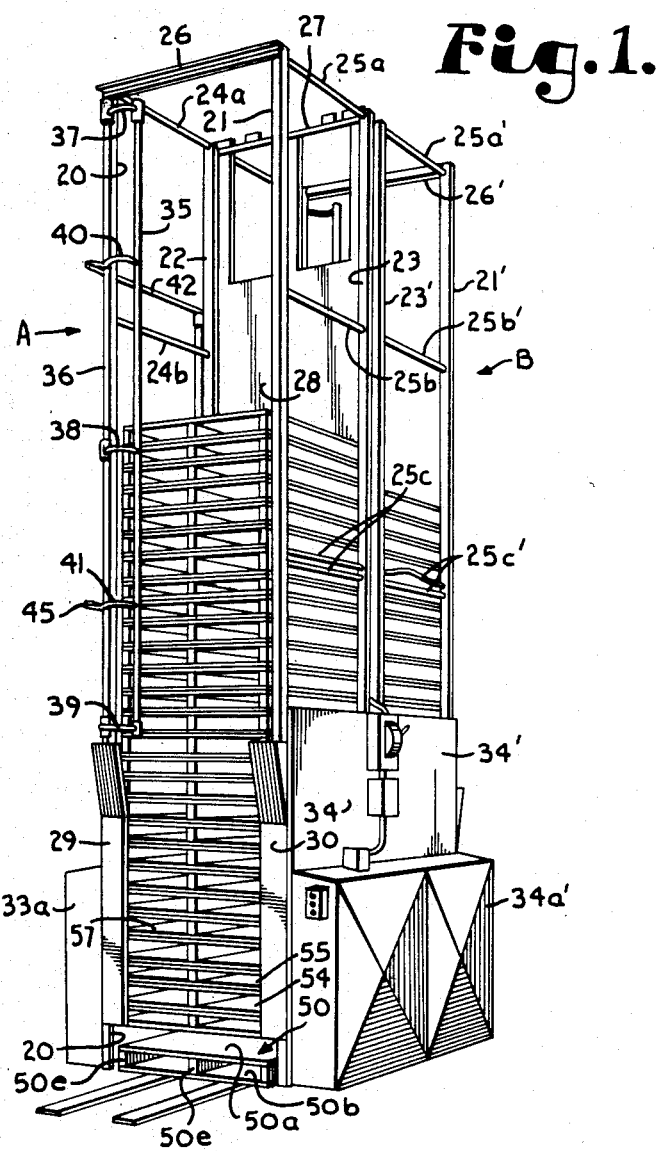
FIG. 1 is a three-quarter perspective view from one front side of two of the subject pallet storing and dispensing machines set back to back (longitudinally axially aligned) in order that either one or two pallets may be made available for pick up at the bottom of the devices at a given time.
Figure 18:
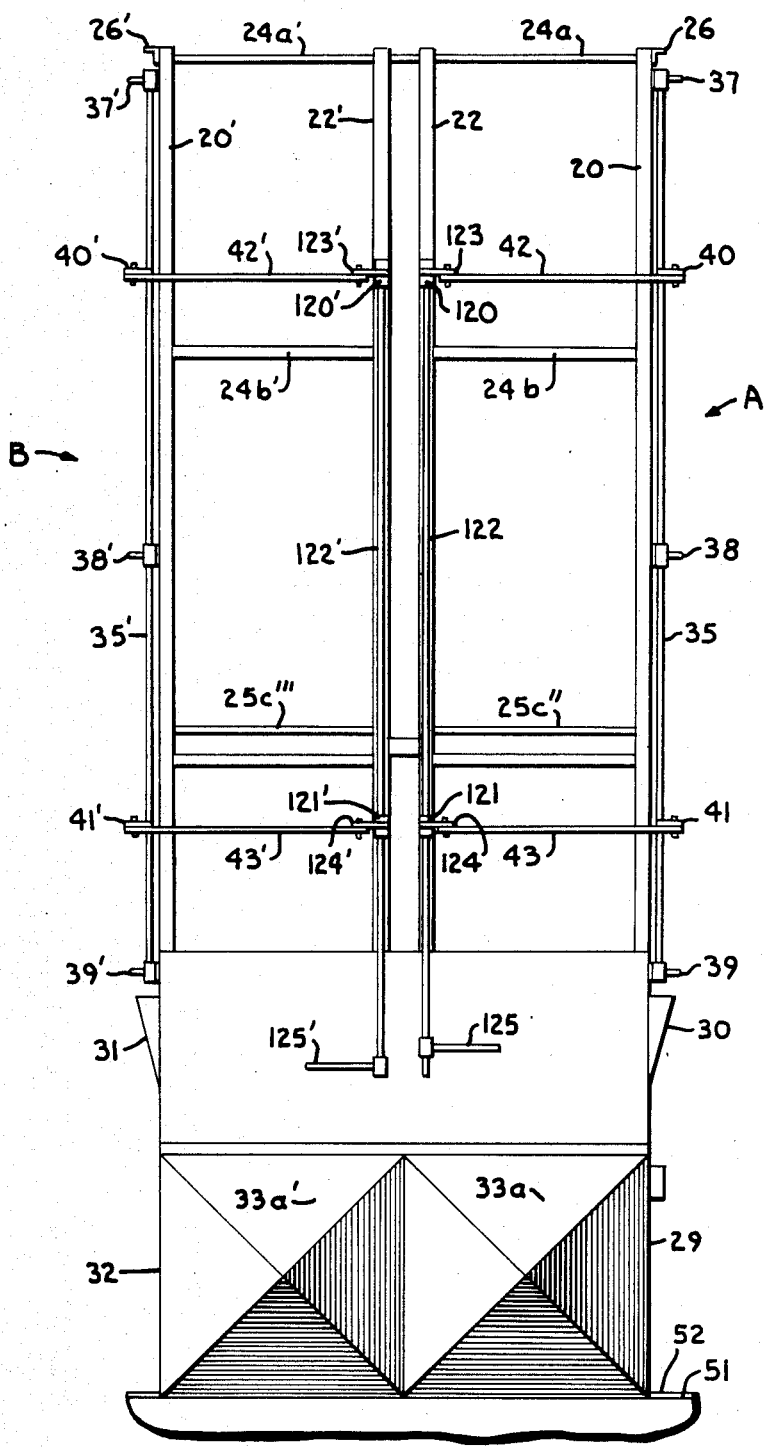

FIG. 18 is a side elevation, from the left hand side of FIGS. 1 and 2, of the two axially aligned pallet machines of FIGS. 1 and 3.

BRIEF DESCRIPTION OF THE INVENTION

The subject device incorporates and provides a mechanical and hydraulic process operative to hold and suspend large stacks of pallets for easy removal or dispensing of pallets therefrom. Such dispensed pallets may be readily handled and used thereafter in conventional manner by means of a warehouse pallet jack or fork truck. Each functional segment of the machine is integrally designed to hold, support and suspend a single vertical stack of pallets, leaving one or more pallets loose therebelow at floor level for easy removal and use. (The drawings show the apparatus and process handling but a single pallet.)

The device eliminates the constant and prevailing problem of pallets stacked too high for handling by employee or machine. It also eliminates the necessary physical labor to lift and remove pallets that are stacked on the floor. The device additionally contributes to the safety of employees. Thus, with the subject machine and incorporated process, an employee or employees does (do) not have to physically lift, possibly drop or receive wood splinters from personally physically handled pallets.

The subject device mechanically and hydraulically supports and grabs wooden pallets, first, by means of engaging the underside of the lowermost pallet of the stack. When it is desired to dispense one or two of the lowermost pallets of the stack downwardly onto the floor for pickup and handling, lateral horizontal booms are driven inwardly to grasp the sides of the second or third lowest pallet of the stack, thus picking up the entire load and support of the pallet stack. Side guides and cam followers are employed to manipulate the original underlying support or shelf member devices as they are moved downwardly, outwardly and then returned upwardly with respect to the stack. Hydraulic cylinders move the frames and arms carrying the shelf members upwardly and downwardly, while the side grabs of the following upper pallets are maintained at a fixed level.

This machine may be automated by photocell lights (in manner similar to automatic doors) to control the starting and cycling of the hydraulic motors. The ultimate result of the cycling operation is to automatically replace removed pallets on the floor beneath the stack, such available for further removal. The hydraulic system may be constructed with pressure sensitive switches and valves operative to control the energies and pressures applied to the pallets, as well as the lifting and holding mechanisms of the device. The electrical circuits may consist of limit switches, electrical hydraulic pressure controls, solenoid valves, relays and holding coils that will control the lowering of the pallets on the lower end of the stack into uneable position.

One or more pallets can be removed without the necessity of two machines. Thus, if the operator wants but one pallet, the machine is set so as to discharge and replace but one. In this case, the side grabs engage the second lowermost pallet of the original stack. If the operator wants two pallets, the machine may be operated to discharge two from the bottom of the stack. In this case, the side inward beam grabs engage the third lowermost pallet, enabling the shelf members to carry down to the floor two pallets, one stacked upon the other.

Alternatively, two machines can be put back to back to act as a double stacker so that two pallets axially in line are provided to be picked up. Each of these machines may, alternatively, drop one or two pallets at a time, whereby machines may draw first the top pallets of the discharged double stack and thereafter the lowermost ones.

When two machines are put back to back, as noted, the assembly is thus automatically available for entry or removal from either side. This allows the two machine assembly to be set in a shelving area and pallets removed from two different aisles. Safety gates are provided to prevent pallets from falling out of the frame, in conjunction with the side and rear walls of the frame. Colored lights may be provided on the control box to signal the employees that the device is cycling or in the cycling process or ready for use. Photo cell lights may be positioned so as to prevent pallets from getting stuck and/or jamming the machine due to oversize or broken pallets.

STRUCTURE OF THE DEVICE

FIGS. 1-4, inclusive show views of the entire device for receiving, storing, handling and sequentially dispensing pallets. It is most important to realize that the showings in the views of FIGS. 1-4, inclusive illustrate a two column, two cell or paired dispensing apparatus for two columns of pallets. This can be particularly seen in FIG. 1, where one column of pallets is seen nearer the viewer, and also in FIG. 3 which is a side view of the assemblage clearly showing the two vertical storage cells A and B or column systems A and B.

Figure 4:
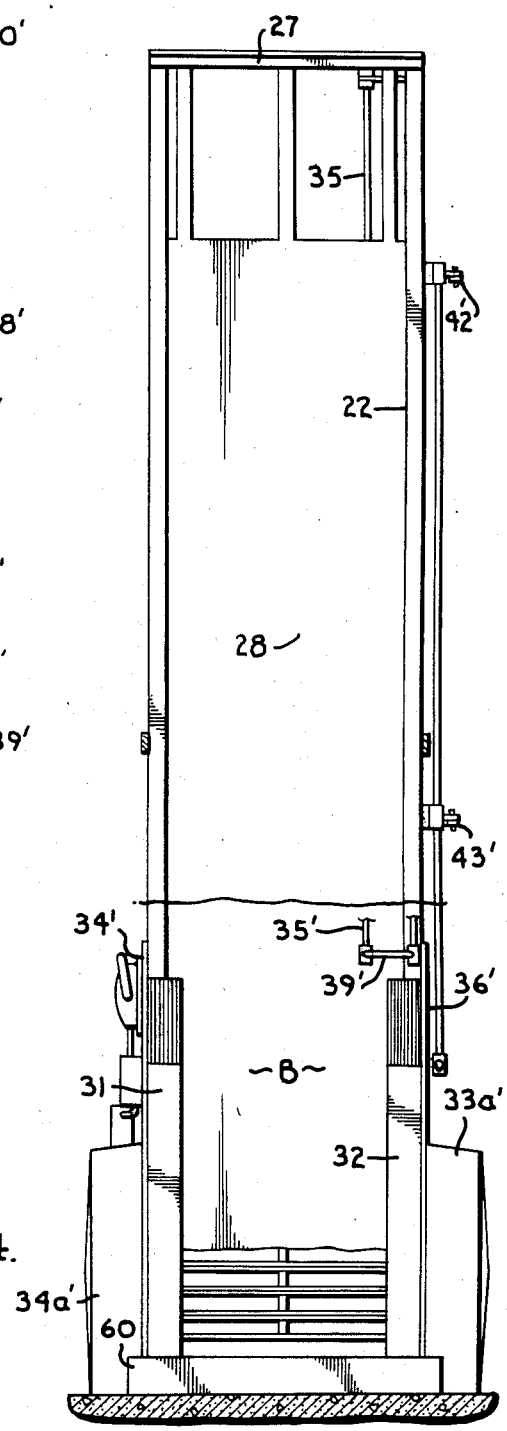
FIG. 4 is a view taken along the line 4—4 of FIG. 3 in the direction of the arrows (thus looking at the rear or inboard wall of the forward (see FIG. 1) pallet handling device of the two shown in FIG. 3). A portion of the back wall of the forward pallet handling device has been cut away to show the orientation of the pallets stacked therein.

Thus, FIG. 1 is a three-quarter perspective view from the front or working side of two pallet storing and dispensing machines set back to back (with the columns of pallets stored therein longitudinally axially aligned and closely spaced with respect to one another) in order that either one or two pallets may be made available for pickup at the bottom of the device at any given time. FIG. 4 shows the opposite end of the devices of FIGS. 1-4, inclusive from FIG. 1. The lower end of the B cell device is blocked off so that there will be only one access end for the pallet pickup and handling devices, specifically, that end seen in FIGS. 1 and 2.

Referring, to FIGS. 1-4, inclusive, the forward (or forward and left hand) cell of the double pallet handling device of these figures will be first described.

Referring, then, to the figures, at 20 and 21 there are seen two front corner angle irons (or box beams) which are attached into the floor or base upon which the machine sits and extend upwardly, vertically, therefrom. Rear vertical angles or beams 22 and 23 form, with front angles or beams 20 and 21, a rectangular, vertical elongate storage space, or column or cell to receive stacked pallets therein as will be described. Horizontal side beam members 24a and 24b may be seen in the upper left hand corner of FIG. 1 (and vertically spaced downwardly therefrom) joining together and bracing apart beams 20 and 22. Like, opposed horizontal side members 25a, 25b and 25c fix together and brace apart beams 21 and 23. Front and rear top members 26 and 27 form a rigid rectangular structure with the members 24a and 25a at the top of the beams 21-23, inclusive.

It is necessary that a complete, three sided structural frame (with suitable front end closures) be provided to surround and enclose the pallet stacks in the paired pallet cells (or columns) A and B in FIGS. 1-4. Closing off the inboard ends of columns or cells A and B, there are provided walls 28 and 28a. Wall 28 is seen from its front side in FIG. 1 and FIG. 2. Wall 28a in cell B in FIG. 4. Wall 28 is welded or otherwise fixedly attached to the structurals 27, 22 and 23. Wall 28a is fixed to the like opposed structurals yet to be described with respect to cell B. The bottom ends of wall(s) 28, 28a must end at least at or above the lowermost level of the lowest normally supported pallet (53) in the subject system, before lowering and dropping thereof in the procedure to be described. For practical purposes, this means cutting off walls 28 and 28a at least at the lower ends of guides and retainers 29 and 30 on the front end of cell A and 31 and 32 (FIG. 4) on the front end of cell B. The upper ends of flanges or closures 29-32, inclusive may be outwardly angled (see FIGS. 1 and 3) to aid in receiving and guiding pallets into proper position. Side sheets 33 and 34 are provided in the lower substantial one third to one half of the height of the side walls (defined by beams 20 and 22 and 21 and 23, respectively), whereby to enclose the panel stack on the sides thereof in addition to braces 24b, 25b, 25c, etc. Opposite the lower portions of side panels 33 and 34 (see FIG. 5) are outwardly structured housings 33a and 34a to form enclosures for the pallet supporting, engaging, lowering, etc. machinery to be described in detail in the later FIGS. 5-17 inclusive.

Insofar as visible, the basic structural members of cell or column B will now be characterized. Since the structurals are the same between the two cells, the numbers given for corresponding parts in cell A will be numbered the same, but primed, except where they have been already differently numbered. In this prime numbering, adjacent like members will be numbered the same, without reversal of the device going from one end to the other.

Looking again at FIGS. 1 and 2, a partial retaining door or door frame for the upper portion of the cell A on its front end includes beam members 35 and 36. These beam members are attached together by horizontal members 37, 38 and 39 at the top, center and bottom of rods or beams 35 and 36. A pivotal mounting for said door frame is provided by additional horizontal beam members 40 and 41 which are welded to rods or beams 35 and 36 and further pivotally mounted on outwardly spaced rods 42 and 43 (upper left corner of FIG. 1 and left hand side of FIG. 3) with pivots at 44 and 45. Beams 42 and 43 are moveable with respect to the vertical side members 20 and 22. Releasable locks (not seen) are provided to enable the gates 35, 38 (and 35', 38') to be rigidly closed when the pallet cells or chambers are full of pallets for operating (and open for recharging the pallets to the pallet chambers above the front members 29-32 with respect to cells A and B).

In FIGS. 1, 2, 4, 5 and 6, relatively large portions of individual pallets may be seen. In FIGS. 9, 10, 11 and 12, fragments of side portions of pallets may be seen. The lower-most pallet may be generally designated 50 in the views of FIGS. 1, 2 and 5, respectively, referring to a pallet which has been discharged onto ground level 51 (or beams 52 positioned thereon to receive the discharged pallet 50). Discharged pallet 50 has top wall 50a, bottom wall 50b, side walls 50c and 50d and center wall 50e. The immediately above spaced suspended pallet 53 has, yet thereabove, stacked second pallet 54. The other, above stacked pallets, in FIG. 5 and FIG. 2, are numbered 55-57, inclusive, stopping the numbering at that point. As may be seen in FIGS. 1, 2, 5 and 6, with pallet 50 discharged onto ground level 51 or beams 52, pallet 53, the bottom pallet of the stack (53-57, etc.) is held positioned thereabove a distance preferably at least the height or thickness of one pallet, most preferably slightly more. This height must be sufficient that the tongues of a pallet handler may impale pallet 50, raise it off ground, and remove it from the space below the stack.

It should be noted, as may be compared between FIGS. 1 and FIGS. 6, beams 52 may extend outwardly beyond the housings enclosing the pallets or may be bounded within the housings.

The parts and mechanisms which enable the support of an entire column of pallets, the disengagement of the lowermost pallet from the stack, the lowering of the latter to ground level 51 or beams 52 and returning the original holding members (FIGS. 5 and 6) to support the stack will now be described.

Reference is made in FIG. 4, to the lower portion thereof. Beam 60 blocks the exposed end of cell or column B in order that there will be only one access entryway in (FIGS. 1 and 2) to the pallet stacks. This has several purposes. In the first place, men using the pallet pickup and handling trucks will always return to the same point to get more pallets. Secondly, there will be no inadvertent simultaneous insertion of pallet tongues or pickup tongues from both directions which might result in collisions or damage to the apparatus from deflected pallet spears or tongues. It should be understood that either end of the device may be employed, but, when one of them is selected, the other one is most preferably blocked off. The door members 35, 36 and 35', 36' may be opened at either end when both or either one of the cells or chambers A and/or B needs to be replenished with additional pallets.

DETAILED OF THE PALLET HANDLING MECHANISMS

Now essentially referring to FIGS. 5-17, respectively, it should first be noted that the apparatus in the housing 33a, 33a', 34a and 34a' is essentially schematically illustrated for better purposes of illustration. This means that the said housings 33a, 33a', 34a and 34a', per se, seen in FIGS. 1-4, inclusive are not shown in scale with respect to the housings shown in the later figures.

The pallet supporting, engaging, lowering, releasing and return engaging devices or mechanisms, as seen in the left sides of FIGS. 5 and 6 and face on in FIG. 7 (a view taken from center to left in FIGS. 5 and 6 with pallets removed) will now be described. Parts in housing 33a will be first numbered. Opposed like parts in housing 34a will be numbered the same, but primed, without reversal of positions of the devices.

Steel or like base plates 70 and 71 are provided as floors in housings 33a and 34a, respectively.

First referring to housing 33a and floor or base plate 70 seen on the left in FIGS. 5 and 6 and facing in FIG. 7, two posts 72 and 73 are provided welded or otherwise fixedly attached to the inboard upper surface of floor 70. Posts 72 and 73 have top horizontal brace bar 74 attached thereto, whereby to rigidly fix posts 72 and 73 in vertical position. Sleeves 75 and 76 are provided enclosing posts 72 and 73. Sleeves 75 and 76 are moveable or slideable upwardly and downwardly with respect to posts 72 and 73. Posts 72 and 73 and sleeves 75, 76 are preferably square in external horizontal transverse section and internal configuration, respectively. Cross beam 77 rigidly fixes sleeves 75 and 76 in parallel vertical relationship with one another and braces 77a and 77b may be provided in aid of this. In FIG. 7, there is shown in full lines the topmost position of beam 77 and sleeves 75 and 76, while, therebelow, there is seen a dotted line showing of the sleeves and beam in their lowermost position on posts 72 and 73.

Hydraulic or pneumatic cylinder 78 is vertically positioned under beam 77 and has piston rod 79 fixed by collar 80 to member 81 rigidly secured to underside of beam 77. The full line showing of FIG. 7, as well as that of the left hand view of FIG. 5 shows the sleeve frame (75, 76, 77) on posts 72 and 73 in the uppermost, start position.

Fixed to the bottom side (outboard) edges of vertical sleeves 75 and 76, there are provided horizontal hollow sleeves 82 and 83. Horizontal sleeves 82 and 83 receive therethrough elongate beams 84 and 85 in slideable fashion. Mounted on the outer (to the right in FIGS. 5 and 6) ends of beams 84 and 85, there are provided angle iron shelf members 86 and 87. Inboard of housing 33a, with respect to beams 84 and 85, there are provided various means of manipulating the position of shelf members 86 and 87 with respect to the pallet(s) that lie thereupon. Most of these mechanisms will be described with respect to FIGS. 7-17, inclusive. However, angles 88 and 89 are fixed to the inner ends of beam 84 and 85, extending centrally inwardly thereof. Angles 88 and 89 have springs 90 and 91 which are removably placed over studs 90a and 91a on the back faces of sleeves 75 and 76, as well as the forward faces of angles 88 and 80 (also as will be best described with respect to FIGS. 11 and 12 and also best seen there).

Vertical plates 92 and 93 (particularly see lower left center portion of FIG. 7 and lower right center portion of the same figure) are welded or otherwise fixedly attached to floor 70 and have upper members 92a and 93a comprising centrally inwardly facing U-members, each slotted to receive one side edge of plate 94 therewithin. In the left center of FIG. 6 and lower left center of FIG. 5, it may be seen that horizontal hydraulic cylinder 95 is mounted by vertical member 97 and has piston rod 98 operated thereby. Piston rod 98 is rigidly connected to a rear vertical flange on plate 94 (not seen in the views of FIGS. 5 and 6, but see lower right center of FIG. 8 with respect to the opposite side device). On the opposite (outward or outboard) edge 94a of plate 94 there is provided a plurality of vertical flanges 99. The center two of flanges 99 are positioned in arcuate relieved opening 94b in plate 94 (see FIG. 6). The other two are attached at the forward outer edges of plate 94. Cooperating flanges on the inner side of member 100 and 100a are used to pivotally mount member 100 on the front edge of plate 94. Elongate beam 100, whose configuration is best seen in the opposite side views of FIGS. 9-12 inclusive, is pivotally mounted on members 99.

Referring still to FIGS. 5-17, inclusive, with the exception of floors 70 and 71 (or base plates 70, 71), all of the like parts on the right hand sides of FIGS. 5 and 6, as well as those parts seen in FIGS. 8-17, inclusive, where identical (in opposition) are numbered the same as those parts numbered in the left hand sides of FIGS. 5 and 6, but primed. Yet further, when additional structural elements of the symmetrical devices of left and right hand sides of FIGS. 5 and 6 are hereinafter described with respect to the more detailed and elaborated figures presented with respect to said right hand side, these parts are numbered primed and, insofar as such as illustrated in the left hand sides of FIGS. 5 and 6 and in FIG. 7, such are numbered the same, but not primed.

Vertical plates 101 and 102 are rigidly fixed to the vertical sides of angle irons bases 101a and 102a therefor and extend upwardly parallel to plates 92 and 93.

BASIC PALLET HANDLING PROCESS DESCRIBED

The pallet handling process of the subject disclosure may be described as follows, first specifically with respect to pallet handling, then more generally, as directed to stackable, grippable items per se. Speaking first of pallets, there is first established a vertical stack thereof in aligned registration of each succeeding pallet on those below. Thereafter, the process involves subsequently dispensing individual pallets (or a plurality of pallets in a stacked group) from the lower end of said stack. (Each of said pallets 50, 53, etc. has normally horizontal top and bottom walls of rectangular configuration, such walls both vertically spaced apart and connected together at their outboard longitudinal edges by normally vertical, substantially rectangular side walls.) The specific process steps, in this context, include:

(1) A stack of pallets 53-57 inclusive, etc., is first supported on a plurality of opposed shelf members 86, 86', 87, 87' which underlie portions of the side edges of the bottom wall of the initial bottommost pallet 53 in said stack.

(2) The stack of pallets 53, etc. is normally supported by said shelf members above floor level at a height at least greater than the thickness of one pallet and, typically, the thickness of several pallets. This distance or height must be sufficient to permit at least the single bottommost pallet 53 and, optionally, several pallets 53, 54 of the initial stack to be lowered to ground level free and clear of the low end of the remainder of said stack.

(3) When the process starts, pallet 50 has been removed from ground 51 or beams 52. A sensor frees the machine for dropping the next pallet(s) when the ground level space is clear. Since (FIG. 9) members 86, 86', 87' and beams 100, 100' are, at start, on the same level, via cylinder 78, said members (FIG. 10) are dropped one pallet thickness so that beams 100, 100' may engage the side walls of an upper pallet, here 54.

(4) One of the initially second 54, third 55 or fourth 56, etc., lowermost pallets in said stack is gripped on its opposed, lateral side walls (FIG. 10) by the opposed, elongate horizontal beam members 100, 100' with sufficient inwardly applied, horizontal, lateral force so as to individually grab and vertically suspend said initially second, third or fourth, etc. bottommost pallet (with sufficient inwardly directed force from pistons 95, 95') so as to enable the support thereon of all the remaining, upwardly extending pallets of the stack.

(5) The first bottommost pallet 53 only, first and second bottommost pallets 53 and 54 only, first, second and third bottommost pallets 53, 54 and 55 only, etc., are lowered individually, or as small stacks, on said shelf members 86, 87, etc. downwardly, clear of the remaining stack and the now lowermost, side gripped, pallet thereof, to closely adjacent or at floor level. (FIG. 11 shows this ultimate lower position, together with the retraction of members 86, 87, etc. which retraction and later return will be later described.)

(6) The opposed underlying shelf members 86-87' inclusive are then disengaged (FIG. 11) from under said originally first bottommost pallet 53 (or originally first and second pallets, originally first, second and third pallets, etc.) by coordinated, lateral, outward motion of said members. In this manner, said first originally bottommost pallet 53 (or originally first and second bottommost, originally first, second and third bottommost, etc. pallet(s)) is (are) deposited on substantial floor level 51 or 52. Such pallet(s) thereafter are available for removal from under the remaining suspended stack by conventional means such as pallet fork trucks, pallet jacks or the like. Thus one or two or the entire dropped stack may be picked up at a given time and carried away from under the remaining suspended stack.

(7) The said disengaged shelf members 86, 86', 87, 87' are then returned inwardly and upwardly (FIG. 12) to underlie and engage the lateral lower edge surfaces of the bottom wall of the now bottommost, side suspended pallet 54 in the remaining stack.

(8) With said shelf members 86, etc. again in place under the entire remaining stack (position of FIG. 9), the opposed, horizontal beam members 100, 100' may be withdrawn from the engagement with the side walls of the said now bottommost pallet 54 so that it and the remaining pallets 55, etc. in the stack piled thereon are once more supported on said underlying shelf members 86, etc.

(9) The process may now be repeated.

(10) Since the horizontal side grab members 100, 100' are at a fixed height:

(a) the mobile shelf members 86, 86' etc. are first dropped a distance of one, two, three, etc. pallet thicknesses before the horizontal grabs 100, 100' are activated;

(b) either the vertical height of the side grab members 100, 100' or the shelf member drop distance (or both) is varied to select the desired number of pallets in the single pallet or stack thereof dispensed on each cycle. In the latter case, suspension of the stack 53 etc. must start at a greater height than seen in the figures and the starting height of members 86, 86', etc. and beams 100, 100' must be adjusted upwardly.

As may particularly be seen in the vertical plan view of FIG. 6, cam followers 103, 103' and 104, 104' are provided on the outboard sides adjacent the rear ends of beams 84 and 85.

Referring, then, to vertical plates 101, 102, 101' and 102' (particularly see FIG. 6), there are rigidly attached to the inboard faces thereof configured camways 105, 106, 105' and 106'. The enlarged details and operation of the camways, the cam followers and the cooperating pivotal cam member 107' (to be described) are best seen in FIGS. 9–13 and 14, inclusive. All this action will be basically described with respect to the single set of parts seen in FIGS. 9–14, inclusive. These are the structures in the upper right corner of FIG. 6.

Referring, then, to the latter figures, cooperating cam member 107' is pivotally mounted by pin 108' through plate 102'. Particularly referring to FIG. 14, screw or bolt 109' is threadably engaged in the outboard face of cam accessory piece 107'. Spring 110' connects from bolt 109' to bolt 111': The latter passes through plate 102' and into the body of cam 106'. Since slot or opening 112' is provided in plate 102', spring 110' always tends to return the cam accessory piece 107' to the abutment positions of FIGS. 9, 10 and 11 (except when cam follower 104' is between cam 106' and associate piece 107' as in FIGS. 12 and 13). In these latter two views, cam follower 104' is returning up the space between camway 106' and attachment 107', forcing 107' away from 106' against the action of spring 110'.

Each of the plates 101, 102, 101' and 102' have this cam, cam attachment and spring loading of the cam attachment with respect to the cams 105–106' inclusive, per se. However, the detailing on such is so small in the views that it is only well seen in FIGS. 9–14 inclusive and thus will not be numbered in the other locations in the drawings. From the side view of plates 101 and 101' in FIG. 5, bolts, springs and slots with respect to plates 101 and 101' and the cams 105 and 105' are illustrated, but not numbered in detail. Looking at the left side of FIG. 5 and plate 101 is equivalent to looking at the outer side of plate 102', as far as structure is concerned. Likewise, looking at the right hand side of FIG. 5, at plate 101', structurally is the same as looking at the outer side of plate 102' in the upper left hand corner of FIG. 6.

With respect to the mechanism for retracting the shelf members 86, 86', 87 and 87' when they reach ground level (FIG. 11) and then returning them to outward position as the said shelf members 86, etc. are raised again, such actions involve the cam members typified by members 106' and 107'. FIGS. 5–9, inclusive all show the mechanism in start position. This involves sleeves 75, 75', 76 and 76' being in the uppermost raised position, most clearly seen in FIGS. 5, 7 and 8. What this means is that the cam follower 104' is positioned on the left hand upper side (in the views of FIG. 9) of cam member 106', above the upper end of pivotal member 107'. The overall pattern is best seen in FIG. 6 where the cam followers 103, 104, etc. can all be seen in the position described. In this view, members equivalent to pivotal member 107' of FIGS. 9–13, inclusive are not visible.

Once pallet 50 is removed from the space above beams 52 on ground level 51, and when a new pallet is called for, by means of piston 78 and piston rod 79, sleeves 75, 75', 76 and 76' are lowered one pallet thickness from the position of FIG. 9 to the position of FIG. 10. What this means with respect to the cam follower 104' is that it moves downwardly on the left hand face of then vertical pivotal member 107' in a straight vertical line. What this first action does is maintain the shelf members 86, 86', etc. inwardly thrust against the spring load of springs 90, 90', 91 and 91' acting between the sleeves 75, etc. and angles 88, 88', etc. Thus, in the initial drop, the position of FIG. 10 is reached whereby opposed beams 100, 100' can operate to grip the side faces (or engage the side faces) of second lowermost pallet 54. The inward edges of beams 100, 100' may be roughened, serrated, toothed or faced with resilient materials such as rubberlike compositions in order to make powerful positive engagement with the pallet 54 in order to support the entire weight of the stack thereon. Pistons 95 and 95', through rods 98 and 98' acting against plates 94 and 94', shove beams 100 and 100' inwardly into positive engagement as seen in FIGS. 10 and 11.

From the position of FIG. 10, once beams 100 and 100' are fully and positively rammed against and into engagement with the sides of pallet 54 with sufficient force to support the entire column of pallets thereabove, pistons 78, 78' and piston rods 79, 79' lower the beams 77, 77' sleeves 75, 75' and 76, 76' down to the grounded position for shelf members 86, 86', etc. seen in FIG. 11. As shelf members 86, 86', etc. reach ground level, the cam follower 104, etc. passes below the lower end of cam member 107', etc. and beams 84, 84', 85 and 85' are driven rearwardly by the action of springs 90, 90', 91 and 91'. The cam follower 104', etc. is stopped against the lower left hand face of camway 106' (in the views of FIGS. 9–11, inclusive) with, as is seen in FIG. 11, the shelf members (here 87', etc.) clear of the sides of pallet 53.

Once the pallet 53 is released onto beams 52 or ground level 51, the shelf members 86, 86', etc. are raised back into support position with respect to pallet 54. The support position is the same as seen in initial start up of action (FIGS. 5–9, inclusive) except for the fact that pallet 53 has been discharged from the lower end of the stack as seen in those views. FIGS. 12, 13 and 14 show a critical intermediate position in the return upwardly of beams 77, 77', etc., sleeves 75, 75', etc., horizontal sleeves 82, 82', etc., beams 84, 84', etc. and shelf members 86, 86', etc. That is, the cam followers 103–104' (the latter seen in FIGS. 13 and 14), which are initially held against the lower faces of cams 105–106', inclusive by springs 90–91', inclusive, as they rise, pass up between the spaced apart lower ends of pivotal members 107', etc. and the inwardly inclined cam faces of cams 105–106'. In the upward rise of the cam followers, they deflect the pivotable cam members like 107' (as seen in FIGS. 12, 13 and 14) and also begin moving inwardly (particularly see FIG. 12) the shelf members 86–87', inclusive.

As the cam followers 103-104' inclusive pass onto the upper vertical surfaces of cams 105-106', the shelf members 86-87', inclusive are fully inwardly extended (as in FIGS. 5-9, inclusive) and thus fully come to underlie and support pallet 54 and the rest of the stack 55, etc. thereabove. The cam followers 103-104' pass out above the upper ends of members like 107' to reach this position, thus permitting the members like 107' to return to the position of FIGS. 9-11, inclusive under the impetus of springs like 110' in the upper right hand side of FIG. 6 and FIG. 14. The cycle may then be repeated with respect to lowering pallet 54 free of the stack based on side engagement of pallet 55, etc.

GENERAL PROCESS DESCRIPTION

The process immediately above described basically comprises, first, establishing a vertical stack of pallets and, thereafter, subsequently dispensing individual pallets from the low end of said stack. Alternatively, the process can involve dispensing several pallets from the low end of said stack. Each of the pallets is of conventional form or shape, thus having normally horizontal top and bottom walls, said latter walls both vertically spaced apart and connected together by normally vertical side walls. A center vertical wall, parallel to the side walls, may be provided additionally.

The stack of pallets is first supported on a plurality of opposed shelf members which underlie portions of the side edges of the bottom wall of the bottommost pallet in said stack. The stack is normally supported by said shelf members at a height above ground level greater than the thickness of one pallet and, typically, slightly greater than the thickness of two pallets. This height must be sufficient to permit the bottommost pallet of the stack to be lowered to ground level free and clear of the low end of the remainder of said stack maintained at the same height. This lowered pallet is picked up from ground level by a fork truck or pallet jack and removed from under the remaining stack.

In the event more than one pallet is to be dropped from the stack, the stack is normally initially supported by said shelf members above floor level at a height at least somewhat greater than the thickness of at least three pallets. In any case, the pallet or stack of pallets lowered to ground level or substantial ground level has to have sufficient clearance thereabove with respect to the remaining supported stack that a pallet fork truck, pallet jack or the like may engage the dropped pallet or stack of pallets, lift same above ground level and remove same from below the remaining suspended stack.

The opposed, lateral side walls of the second lowermost pallet in said stack, once the cycle is initiated, are gripped by opposed, horizontal beam members with sufficiently inwardly applied, lateral force so as to individually engage and vertically suspend (fix) said second lowermost pallet with sufficient force to enable the support thereon and thereabove of the remaining, upwardly extending pallets of the stack thereon. Before this is done, the entire stack is preferably lowered one pallet thickness FIG. 10. This action permits the initial supporting shelf members and following side engaging beam members to be positioned at the same initial level, thus saving space, as well as permitting the initially supporting shelf members to always return to the same height.

In the event that more than one pallet is to be dropped from said stack, the third lowermost or fourth lowermost, etc. pallet in the stack is gripped by the said opposed, horizontal beam members. In such case, in the system shown and described, the initial supporting shelf members must be dropped a thickness of two or more pallets before such lateral engagement.

The first bottommost pallet on said shelf members is then lowered downwardly, clear of the remaining stack (and said second initial lowermost pallet), to or closely adjacent to floor level. The underlying, supporting shelf members with respect to said first lowermost pallet are disengaged therefromunder by coordinated, lateral, outward motion of said shelf members. This deposits the first lowermost pallet on floor level or substantial floor level, whereby it thereafter is available for removal from under the remaining suspended stack. The discharged pallet is picked up by pallet fork trucks, pallet jacks and the like and carried away from under said remaining suspended stack. During the time of lowering and disengaging the shelf members with the first bottommost pallet thereon, the entire stack is supported by the side engagement of the second lowermost pallet.

In the event of two or more pallets being lowered for removal from the stack, at least the first and second bottommost pallets are lowered on said shelf members downwardly, clear of the remaining stack and said third lowermost pallet to at or closely adjacent floor level. Said opposed underlying shelf members are disengaged from under said initial first bottommost pallet by the said coordinated, lateral, outward motion of said members. Thereby, said first and second initially lowermost pallets are deposited in a stack on the floor or substantial floor level and are available for removal from under the remaining suspended stack.

The said disengaged shelf members are then returned inwardly and upwardly to underlie and engage the lower edge surfaces of the bottom wall of said second, side suspended, but now bottommost, pallet in the remaining stack. In the case of a discharge of a plurality of pallets, the said underlying shelf members are returned inwardly and upwardly to engage the lower edge surface of the bottom wall of at least said originally third lowermost, side suspended, but now bottommost pallet in the remaining stack.

Thereafter, with the stack of pallets firmly received on said upwardly and inwardly returned shelf members, the said opposed, horizontal beam members are withdrawn from engagement with the side walls of the now bottommost pallets so that it and the remaining pallet stack piled thereon is entirely supported on and by said underlying shelf members.

As may be seen in FIGS. 1-4, inclusive, a plurality of pallet stacks may be mounted in an axial row with respect to the longitudinal axes of the pallets, adjacent one another, whereby a plurality of pallets or plurality of stacks of pallets may be dropped simultaneously in an axial row from the respective stacks for simultaneous pickup and removal thereof.

Most preferably, the stack of pallets is first supported on at least four paired, opposed shelf members underlying substantial end portions of the side edges of the bottom wall of the bottommost pallet. The said opposed, horizontal beam members employed to individually engage and vertically suspend the second bottommost pallet of the stack (by the sides thereof) are preferably positioned between the said spaced apart, paired shelf members (total four in number) employed to underlie portions of the bottom edges of the bottom wall of the initial bottommost pallet.

Preferably, longitudinal runners or beams are provided on the floor surface to receive the first bottommost pallet or stack thereon in such manner as to readily enable freeing and clearing of the opposed shelf members initially supporting such therefrom.

The said plurality of opposed shelf members are preferably each mounted on one end of a normally horizontal, spring loaded beam or arm which, in the process described, is guided in inward and outward extension by camways adapted to be engaged by cam followers fixed to portions of said beams or arms.

FIG. 18

FIG. 18 is a side elevation, from the left hand side of FIGS. 1 and 2, of the two axially aligned pallet machines of FIGS. 1 and 3, like FIG. 3 in showing the back to back juxtaposition of such, but also particularly illustrating the mechanism for operating the end doors to the cells A and B. The rest of the structure has been described with respect to the previous figures.

Referring, then, to FIG. 18, fixedly mounted, with respect to the outer surfaces of vertical structurals 22 and 22', are split bearings 120 and 121 on beam 22 and 120' and 121' on beam 22'. Elongate rod 122 are rotatably received in and supported by the said bearings 120, 121, inclusive in a manner as will be described. At the lower ends of rods 122 and 122' are vertically spaced apart handles 125 and 125'.

Fixed to the upper and lower intermediate lengths of rods 122 and 122' are arcuate arms 123 and 124 with respect to rod 122 and 123' and 124' with respect to rod 122'. Arms 123-124' inclusive fit between the bearing halves and thus aid in carrying rods 122 and 123. These arms are pivotally fixed at their outer ends to elongate arms 42, 43, 42' and 43'. The latter extend between and are pivotally fixed to, in addition to the arcuate arms 123-124', inclusive, arcuate arms 40, 41 on rod 35 and arms 40' and 41' on rod 35'.

In order to operate the doors, it may be seen that, with respect to the door to cell A seen in FIGS. 1 and 2, such may be opened by the operator grasping handle 125 and moving it toward the observer in the view (in an arc). This action rotates rod 122, thus moving the outer ends of arms 123 and 124 to the left. Such action also pulls arms 42 and 43 to the left in the view in FIG. 18, thus also moving the free ends of arcuate arms 40 and 41 to the left. This, from the view in FIGS. 1 and 2 then pivots rod 35 to open position. To close the door/rod 35, the opposite action is taken.

VARIATIONS

While the subject device is admirably constructed and operable to handle purely rectangular objects such as pallets and particularly pallets, it is not limited to such use. Arcuate sided or even round items to be dispensed from a stack may be dispensed from the subject device in the manner previously described by virtue of making arcuate or shaped side engagement beams 100 and 100' and shaping or constructing the shelves or shelf members 86-87' in such manner and making them of such extent that they will underlie the required bottom edge portions of the articles being dispensed. When there is a different type of article from pallets, the sides thereof must be of sufficient rigidity (and the objects themselves) that the required, inwardly directed force from beams 100 and 100', however shaped, will not collapse the objects.

Even with pallets, it is possible to have a distorted or broken stringer or side wall on one or more of the pallets in the stack. Thus, as an option or alternative with respect to FIGS. 7-14, inclusive, plates 94, 94' and beams 100 and 100' may be positioned one half pallet thickness above the position in which they are illustrated (in start FIG. 9 and first stage FIG. 10). This being the case, when the inward grab or action of beams 100 and 100' takes place, instead of both the upper and lower flanges of beams 100 and 100' gripping but a single pallet 54, the lower flange of beams 100, 100' engages centrally of the side wall or pallet 54 and the upper such flange the center wall of the pallet 55. Such engagement also allows for difference in thickness of the stacked adjacent pallets 54 and 55, due to the pivotable mounting of beams 100 and 100' with respect to plates 94 and 94'.

From the foregoing, it will be seen that this invention is one well adapted to attain all of the ends and objects hereinabove set forth together with other advantages which are obvious and which are inherent to the process.

As many possible embodiments may be made of the invention without departing from the scope thereof, it is to be understood that all matter herein set forth or shown in the accompanying drawings is to be interpreted as illustrative and not in a limiting sense.

We claim:

1. A process of first establishing a vertical stack of pallets and thereafter subsequently dispensing pallets from the low end of said stack, each of said pallets having normally horizontal top and bottom walls, such walls both vertically spaced apart and connected together by normally vertical side walls, comprising the steps of:
   (1) first supporting said stack of pallets on a plurality of opposed shelf members underlying portions of the side edges of the bottom wall of the bottommost pallet in said stack, said stack normally supported by said shelf members above floor level at a height at least greater than the thickness of the one pallet and at least sufficient to permit at least the bottommost pallet of the stack to be lowered to ground level free and clear of the low end of the remainder of said stack,
   (2) gripping the opposed, lateral side walls of at least one of the next lowermost pallets in said stack by opposed, horizontal beam members with sufficient inwardly applied, lateral force so as to grab and vertically suspend at least said grabbed pallet with sufficient force to enable the support thereon of the remaining, upwardly extending pallets of the stack thereon,
   (3) lowering at least the first bottommost pallet on said shelf members moving in as linear path downwardly, clear of the remaining stack and said gripped next lowermost pallet, to closely adjacent floor level and disengaging said opposed shelf members from under said first pallet by coordinated, lateral, outward motion of said members, whereby at least said first pallet is deposited on substantial floor level and thereafter is available for removal from under the remaining suspended stack, thus to be lifted up and carried away from under said suspended stack,
   (4) returning said shelf members inwardly and upwardly to underlie and engage the lower edge surfaces of the bottom wall of the side suspended, but now bottommost, pallet in the remaining stack, and (5) withdrawing said opposed, horizontal beam members from engagement with the side walls of said now bottommost pallet so that it and the remaining pallet stack piled thereon is once more supported on said underlying shelf members.

2. A process as in claim 1 wherein a plurality of pallet stacks are mounted in an axial row with respect to the longitudinal axes of the pallets, adjacent one another, whereby a plurality of pallets may be dropped simultaneously in an axial row from the respective stacks for simultaneous liftup and removal thereof.

3. A process as in claim 1 wherein said stack of pallets resting on the plurality of opposed shelf members is lowered at least the thickness of one pallet in the stack before the opposed, horizontal beam members operate to grip opposed portions of one of the next lowermost pallets in the stack.

4. A process as in claim 1 wherein groups of several pallets, each group in a small stack, are sequentially dispensed from the lower end of said stack, said stack normally supported by said shelf members above floor level at a height at least greater than the thickness of the number of pallets stacked in each group and sufficient to permit a plurality of the lowermost pallets of the stack to be lowered in a group as a small stack to substantial ground level free and clear of the low end of the remainder of said stack, gripping the opposed, lateral side walls of at least the next lowermost pallet in said stack not in said group by said opposed, horizontal beam members with sufficient inwardly applied, lateral force so as to vertically suspend at least said pallet with sufficient force to enable the support thereon of the remaining upwardly extending pallets of the stack, lowering said group of pallets on said shelf members downwardly, clear of the remaining stack and said next lowermost gripped pallet, to closely adjacent floor level and disengaging said opposed shelf members from under said first bottommost pallet by coordinated, lateral, outboard motion of said members, whereby said group of pallets is deposited in a stack on substantial floor level and thereafter is available for removal from under the remaining suspended stack, thus to be lifted up and carried away from under said suspended stack, returning said shelf members inwardly and upwardly to underlie and engage the lower edge surfaces of the bottom wall of said next lowermost, side suspended, but now bottommost pallet in the remaining stack and withdrawing said opposed, horizontal beam members from engagement with the side walls of said now bottommost pallet so that it and the remaining pallet stack piled thereon are once more supported on said underlying shelf members.

5. A process as in claim 4 wherein said stack of pallets resting on the plurality of opposed shelf members is lowered a distance equal to at least the thickness of said small stack of pallets before the opposed, horizontal beam members operate to grip opposed portions of one of the next lowermost pallets in the stack.

6. A process as in claim 1 wherein a plurality of pallet stacks are mounted in an axial row with respect to the longitudinal axes of the pallets, said pallet stacks positioned closely adjacent one another, whereby a plurality of pallets may be dropped simultaneously in an axial row from the respective pallet stacks for simultaneous liftup and removal thereof.

7. An apparatus for first establishing and storing a vertical stack of pallets and thereafter subsequently dispensing pallets sequentially from the low end of said stack, each of said pallets having normally horizontal top and bottom walls, such walls both vertically spaced apart and connected together by normally vertical side walls, comprising in combination:

(1) means comprising a plurality of opposed, normally horizontal shelf members for supporting from below a vertical stack of registered and aligned pallets by underlying portions of the side edges of the bottom wall of the bottommost pallet in said stack, said means normally supporting said pallet stack at a height at least greater than the thickness of one pallet and at least sufficient to permit at least the bottommost pallet of the stack to be lowered to substantial ground level on said shelf members free and clear of the low end of the remainder of said stack, (2) means comprising opposed, horizontal beam members for gripping the opposed, lateral sides of at least one of the next lowermost pallets in said stack with sufficient inwardly applied, lateral force so as to grab and vertically suspend at least said next lowermost pallet with sufficient force so as to enable the continued support thereon of the remaining upwardly extending pallets of the stack, (3) means for lowering said opposed shelf members in a linear path, with at least the first, bottommost pallet carried thereon, downwardly, clear of said remaining stack and suspended next lowermost pallet, to closely adjacent floor level and thereafter disengaging and removing said opposed shelf members from and from under said first bottommost pallet by coordinated lateral outward motion of said shelf members, whereby at least said first pallet is deposited on substantial floor level and thereafter is available for removal from under the remaining suspended stack, thus to be lifted up and carried away from under said suspended stack, (4) means for returning said opposed shelf members inwardly and upwardly whereby to underlie and engage the lower edge surfaces of the bottom wall of said side suspended, now bottommost pallet in the remaining stack and (5) means for withdrawing said opposed, horizontal beam members from engagement with the side walls of said now bottommost pallet, whereby the remaining pallet stack is once more supported by and on said underlying shelf members.

8. Apparatus as in claim 7 wherein a plurality of pallet storing and dispensing apparatus assemblies are mounted in an axial row with respect to one another and the longitudinal axes of the pallets and pallet stacks carried therewithin, said assemblies positioned closely adjacent to one another, whereby one or a plurality of pallets may be dropped simultaneously in an axial row from the respective aligned stacks for simultaneous liftup and removal thereof.

9. Apparatus as in claim 7 wherein groups of several pallets, each group in a small stack, are sequentially dispensed from the low end of said vertical stack of pallets, the normally horizontal shelf member means normally supporting said pallet stack at a height greater than the thickness of the number of pallets stacked in each said group and sufficient to permit a plurality of the lowermost pallets of the stack to be lowered, in a group as a small stack, to substantial ground level on said shelf members free and clear of the low end of the remainder of said stack, the opposed, horizontal beam member means adapted to grip the opposed lateral sides of at least the next lowermost pallet of said stack not in said group with sufficient inwardly applied, lateral force so as to grab and vertically suspend at least said pallet with sufficient force to enable continued support thereon of the remaining upwardly extending pallet stack, the means for lowering said opposed shelf members downwardly, clear of said remaining stack and the gripped lowermost pallet thereof being operative to carry the said group of initially bottommost pallets thereon to closely adjacent floor level and thereafter disengage and remove said opposed shelf members from under the bottommost pallet of said group by coordinated lateral outward motion of said shelf members, whereby said pallets are deposited on substantial floor level in a stack and thereafter are available for removal from under the remaining suspended pallet stack, thus to be lifted up and carried away from under said suspended stack, and the means for returning the opposed shelf members inwardly and upwardly being operative to cause said shelf members to underlie and engage the lower edge surfaces of the bottom wall of the said gripped, next lowermost pallet not in said group.

10. Apparatus as in claim 7 including a vertically extending, rectangular four sided frame for enclosing and retaining in position said vertically upright stack of pallets, said frame including a rear wall and two side walls connected to spaced apart portions of said rear wall and extending at substantial right angles thereto, said three walls vertical in orientation and at least partial door means being provided in the upper portion of one side wall front edge of said frame for alternatively freeing and blocking at least the upper portion of the fourth, front side of said frame, said door means extending a substantial part of the vertical height of said frame, whereby, when such is opened, said door permits inloading of pallets on said opposed shelf members and the stack of pallets supported thereby and when such is closed, serving to aid, in combination with said side walls and rear wall of frame, in retaining said pallet stack and the members thereof in proper registering, aligned, columnar vertical extension upwardly from said lowest pallet underlying shelf members, there being, in the lower portions of the fourth, front side of the frame, retainer panels connected to the lower portion of the side wall front edges operative to aid in alignment of lower pallets in said stack.

11. Apparatus as in claim 7 wherein the said opposed, horizontal beam members employed to grab and vertically suspend one of the lowermost pallets of the stack are positioned between spaced apart, paired shelf members employed to underlie portions of the side edges of the bottom wall of the initial bottommost pallet, whereby said shelf members may move upwardly, downwardly, inwardly and outwardly without interference with or contact with said beam members.

12. Apparatus as in claim 7 wherein two of the pallet storing and dispensing apparatus assemblies are positioned in an axial row with respect to one another and the longitudinal axes of the pallets and pallet stacks carried therewithin, said storing and dispensing assemblies positioned closely adjacent to one another, whereby pallets may be dropped simultaneously in an axial row from the respective aligned stacks for simultaneous liftup and removal thereof, 13. Apparatus as in claim 7 wherein longitudinal runners are provided on the floor surface to receive the first bottommost pallet thereon in such manner as to readily enable freeing and clearing of the opposed shelf members initially supporting such therefrom.

14. A process of first establishing a vertical stack of like individual items and thereafter subsequently dispensing such items from the low end of said stack, each of said items having normally horizontal top and bottom edge portions, such edge portions both vertically spaced apart and connected together by normally vertical side wall portions, comprising the steps of:

(1) first supporting said stack of items on a plurality of opposed shelf members underlying opposed parts of the bottom edge portions of the side walls of the bottommost item in said stack, said stack normally supported by said shelf members above floor level at least at a height greater than the thickness of one said item and at least sufficient to permit at least the bottommost item of the stack to be lowered to substantial ground level free and clear of the low end of the remainder of the stack, (2) gripping opposed portions of the side walls of at least one of the next lowermost items in said stack by opposed, horizontal beam members, such members congruent in form with said item side wall opposed portions, with sufficient inwardly applied, lateral force as to grab and vertically suspend at least said grabbed item with sufficient force to enable the support thereof of the remaining, upwardly extending items of the stack thereon, (3) lowering at least the first bottommost item carried on said shelf members moving in a linear path downwardly, clear of the remaining stack and at least said gripped next lowermost item, to at least closely adjacent floor level and disengaging said opposed shelf members from under at least said first item by coordinated, lateral, outward motion of said members, whereby at least said first item is deposited on substantial floor level and thereafter is available for removal from under the remaining suspended stack, thus to be lifted up and carried away from under said suspended stack, (4) returning said shelf members inwardly and upwardly to underlie and engage parts of the bottom side edge portions of the side walls of said side suspended, now bottommost item in the remaining stack, and (5) withdrawing said opposed, horizontal beam members from engagement with the opposed side wall portions of said now bottommost item so that it and the remaining items stacked thereon are once more supported on said underlying shelf members.

15. A process as in claim 14 wherein said stack of like individual items is dropped at least one thickness of one item in the stack before the opposed, horizontal beam members operate to grip opposed portions of the side walls of at least the second lowermost item in said stack.

16. A process as in claim 14 wherein groups of several items, each grouped in a small stack, are sequentially dispensed from the lower end of said stack, said stack normally supported by said shelf members above floor level at a height at least greater than the thickness of the number of items stacked in each group and sufficient to permit a plurality of the lowermost items of the stack to be lowered in a group as a small stack to substantial ground level free and clear of the low end of the remainder of said stack, gripping opposed, lateral side wall portions of at least the next lowermost item in said stack not in said group by said opposed, horizontal beam members with sufficient inwardly applied, lateral force so as to vertically suspend at least said item with sufficient force to enable the support thereon of the remaining upwardly extending items of the stack, lowering said group of items on said shelf members downwardly, clear of the remaining stack and said next lowermost gripped item, to closely adjacent floor level and disengaging said opposed shelf members from under said first bottommost item by coordinated, lateral, outboard motion of said members, whereby said group of items is deposited in a stack on substantial floor level and thereafter is available for removal from under the remaining suspended stack, thus to be lifted up and carried away from under said suspended stack, returning said shelf members inwardly and upwardly to underlie and engage the lower edge surfaces of the bottom wall of said next lowermost, side suspended, but now bottommost item in the remaining stack and withdrawing said opposed, horizontal beam members from engagement with the side walls of said now bottommost items so that it and the remaining items stacked thereon are once more supported on said underlying shelf members.

17. A process as in claim 16 wherein said stack of items resting on the plurality of opposed shelf members is lowered a distance equal to at least the thickness of said small stack of items before the opposed, horizontal beam members operate to grip opposed side wall portions of one of the next lowermost items in the stack.

18. A process as in claim 14 wherein said stack of items resting on the plurality of opposed shelf members is lowered at least the thickness of one item in the stack before the opposed, horizontal beam members operate to grip opposed portions of one of the next lowermost items in the stack.

19. An apparatus for first establishing and storing a vertical stack of like individual items and thereafter subsequently dispensing such items from the low end of said stack, each of said items having normally horizontal top and bottom edge portions, such edge portions both vertically spaced apart and connected together by normally vertical side wall portions, comprising, in combination:

(1) means comprising a plurality of opposed, normally horizontal shelf members for supporting from below a vertical stack of registered and aligned said items by underlying portions of the side edges of the bottom wall of the bottommost said item in said stack, said means normally supporting said items stacked at a height at least greater than the thickness of one said item and at least sufficient to permit at least the bottommost item of the stack to be lowered to substantial ground level on said shelf members free and clear of the low end of the remainder of the stack, (2) means comprising opposed, horizontal beam members for gripping the opposed, lateral sides of at least one of the next lowermost items in said stack with sufficiently inwardly applied lateral force so as to grab and vertically suspend at least said next lowermost item with sufficient force so as to enable the continued support thereon of the remaining upwardly extending items of the stack, (3) means for lowering said opposed shelf members in a linear path, with at least the first, bottommost item carried thereon, downwardly clear of the remaining item stack and suspended next lowermost item, to closely adjacent floor level and thereafter disengaging and removing said opposed shelf members from and from under said first bottommost item by coordinated, lateral outward motion of said shelf members, whereby at least said first item is deposited on substantial floor level and thereafter is available for removal from under the remaining suspended item stack, thus to be lifted up and carried away from under said stack, (4) means for returning said opposed shelf members inwardly and upwardly whereby to underlie and engage the lower edge surfaces of the bottom wall of said side suspended, now bottommost item in the remaining stack, and (5) means for withdrawing said opposed, horizontal beam members from engagement with the side walls of said now bottommost item, whereby the remaining item stack is once more supported by and on said underlying shelf members.

20. Apparatus as in claim 19 wherein groups of several items, each group in a small stack, are sequentially dispensed from the lower end of said vertical stack of items, the normally horizontal shelf member means normally supporting said item stack at a height greater than the thickness of the number of items stacked in each said group and sufficient to permit a plurality of the lowermost items of the stack to be lowered, in a group as a small stack, to substantial ground level on said shelf members free and clear of the low end of the remainder of said stack, the opposed, horizontal beam member means being adapted to grip the opposed lateral sides of at least the next lowermost item of said stack not in said group with sufficiently inwardly applied, lateral force so as to grab and vertically suspend at least said item with sufficient force to enable continued support thereon of the remaining upwardly extending items in the stack, the means for lowering said opposed shelf members downwardly, clear of the remaining stack and the gripped, lowermost item thereof, being operative to carry the said group of initially bottommost items thereon to closely adjacent floor level and thereafter disengage and remove said opposed shelf members from under the bottommost item of said group by coordinated lateral outward motion of said shelf members, whereby said items are deposited on substantial floor level in a stack and thereafter are available for removal from under the remaining suspended items of the stack, thus to be lifted up and carried away from under said suspended stack, and the means for returning the opposed shelf members inwardly and upwardly being operative to cause said shelf members to underlie and engage the lower edge surfaces of the bottom wall of the said gripped, next lowermost item not in said group.

21. Apparatus as in claim 20 wherein said stack of items resting on the plurality of opposed shelf members is lowered a distance equal to at least the thickness of said small stack of items before the opposed, horizontal beam members operate to grip opposed portions of one of the next lowermost items in the stack.

22. Apparatus as in claim 19 wherein said stack of items resting on the plurality of opposed shelf members is lowered at least the thickness of one item in the stack before the opposed, horizontal beam members operate to grip opposed portions of one of the next lowermost items in the stack.

23. Apparatus as in claim 19 wherein the said opposed, horizontal beam members employed to individually grab and vertically suspend the said next lowermost item of the stack are positioned between spaced apart, paired shelf members employed to underlie portions of the side edges of the bottom wall of the intially bottommost item, whereby said shelf members may move upwardly, downwardly, inwardly and outwardly without interference with or contact with said beam members.

24. Apparatus as in claim 19 wherein longitudinal runners are provided on the floor surface to receive the first bottommost item thereon in such manner as to readily enable freeing and clearing of the opposed shelf members initially supporting such therefrom.

* * * * *